March 28, 1950            T. KNOX            2,501,726
FLAP AND DIVE BRAKE OPERATING MECHANISM
Filed Nov. 1, 1945            5 Sheets-Sheet 1
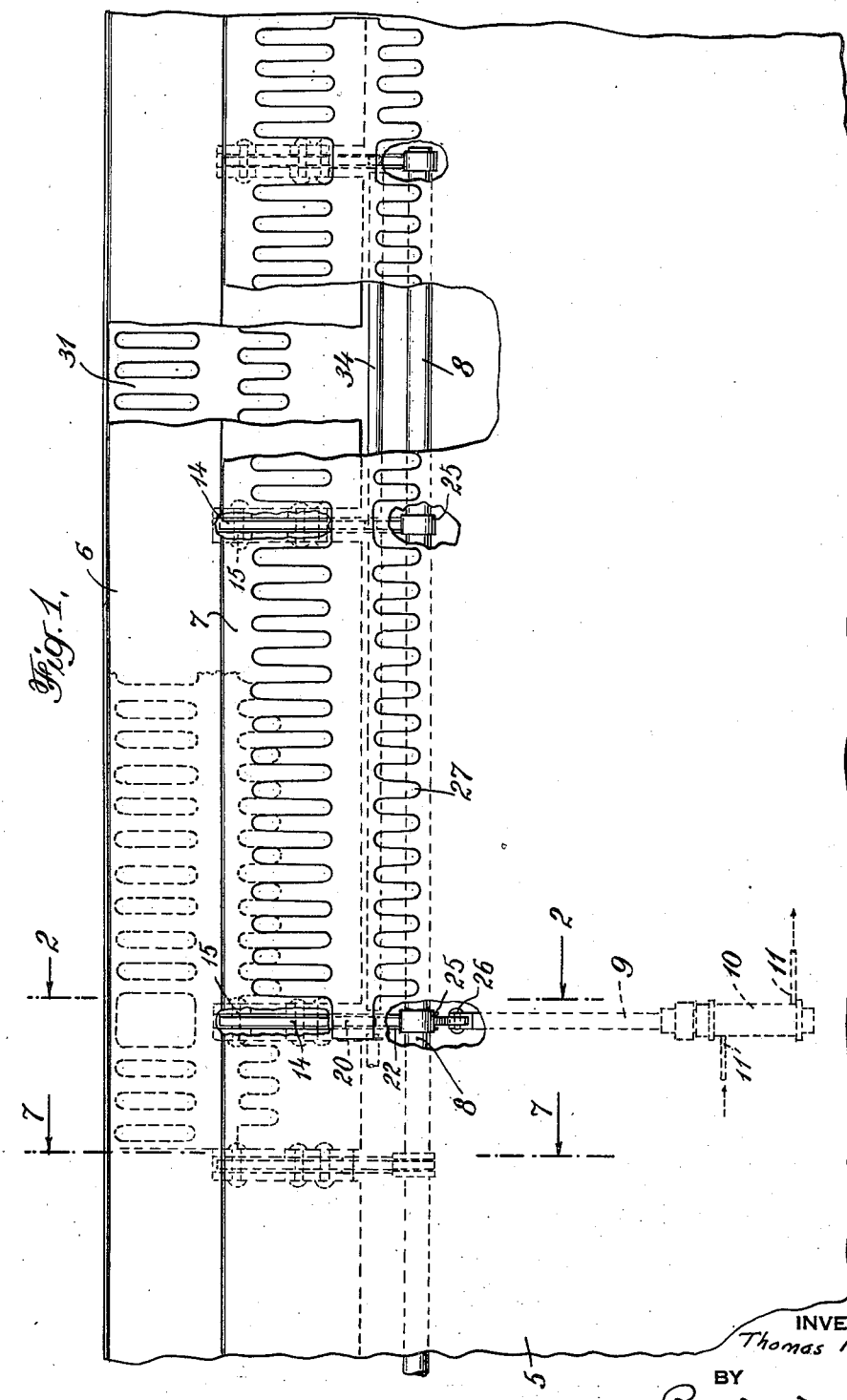
INVENTOR
*Thomas Knox*
BY
*Pennie Davis Marvin & Edmonds*
ATTORNEYS

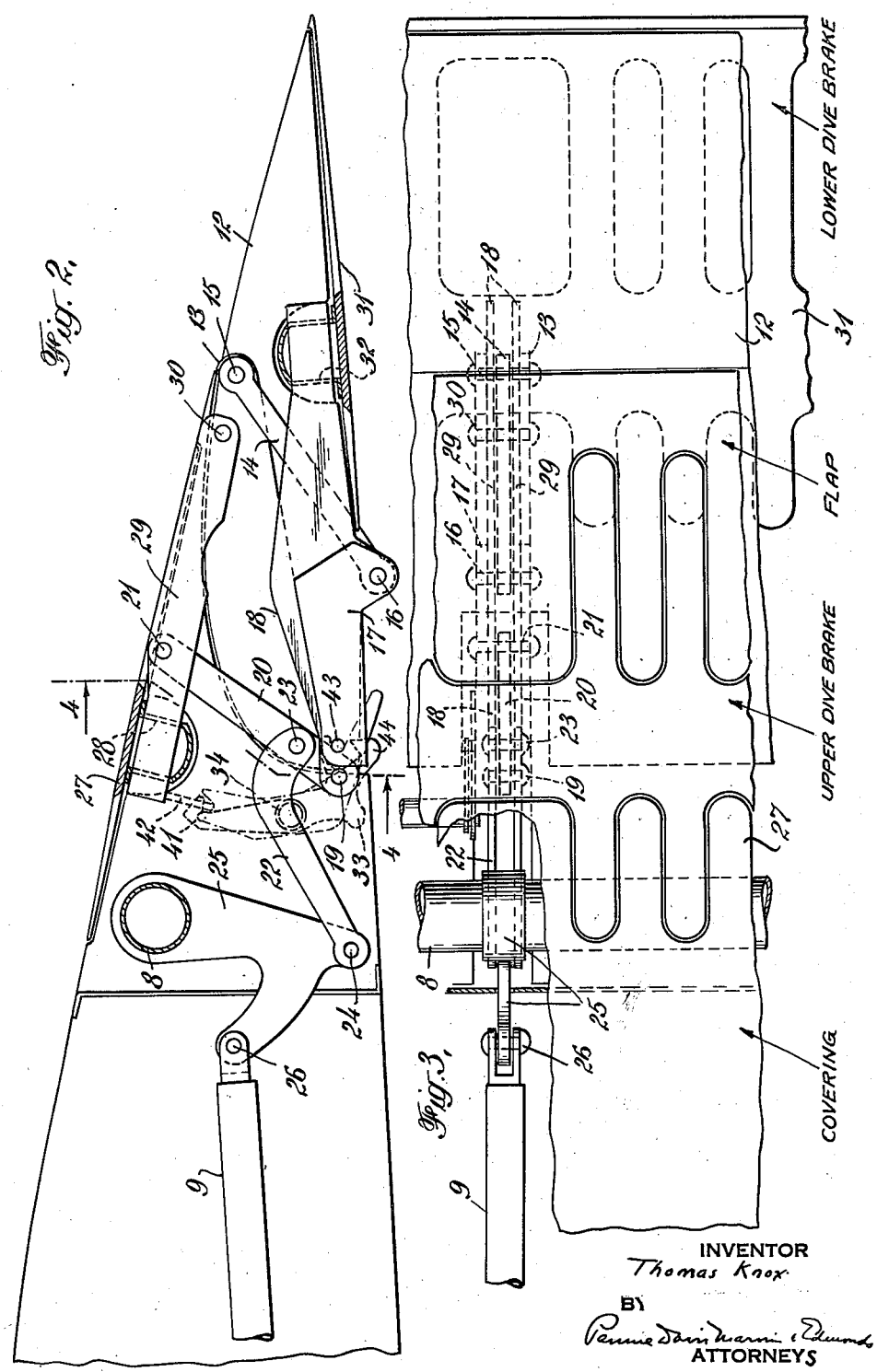

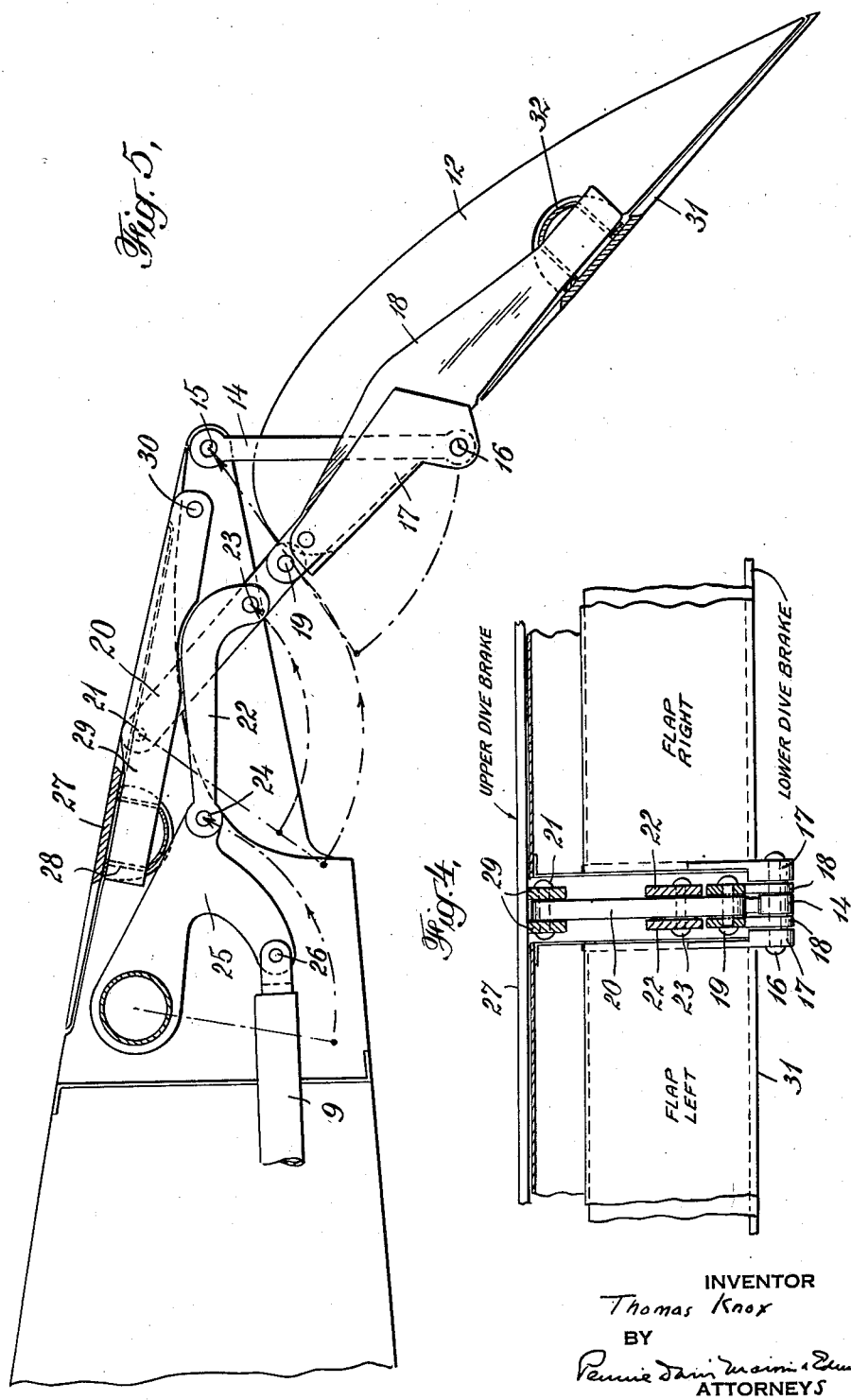

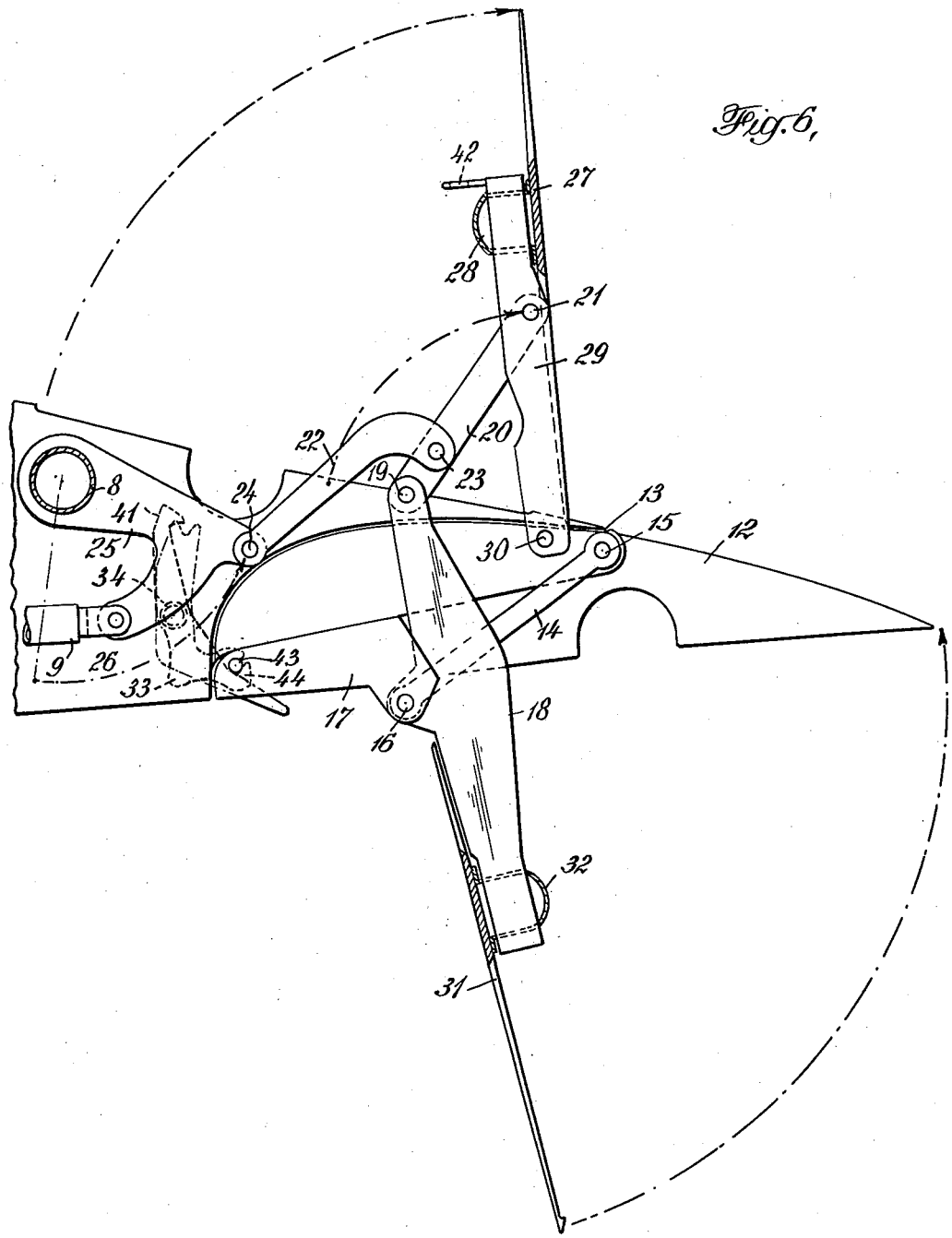

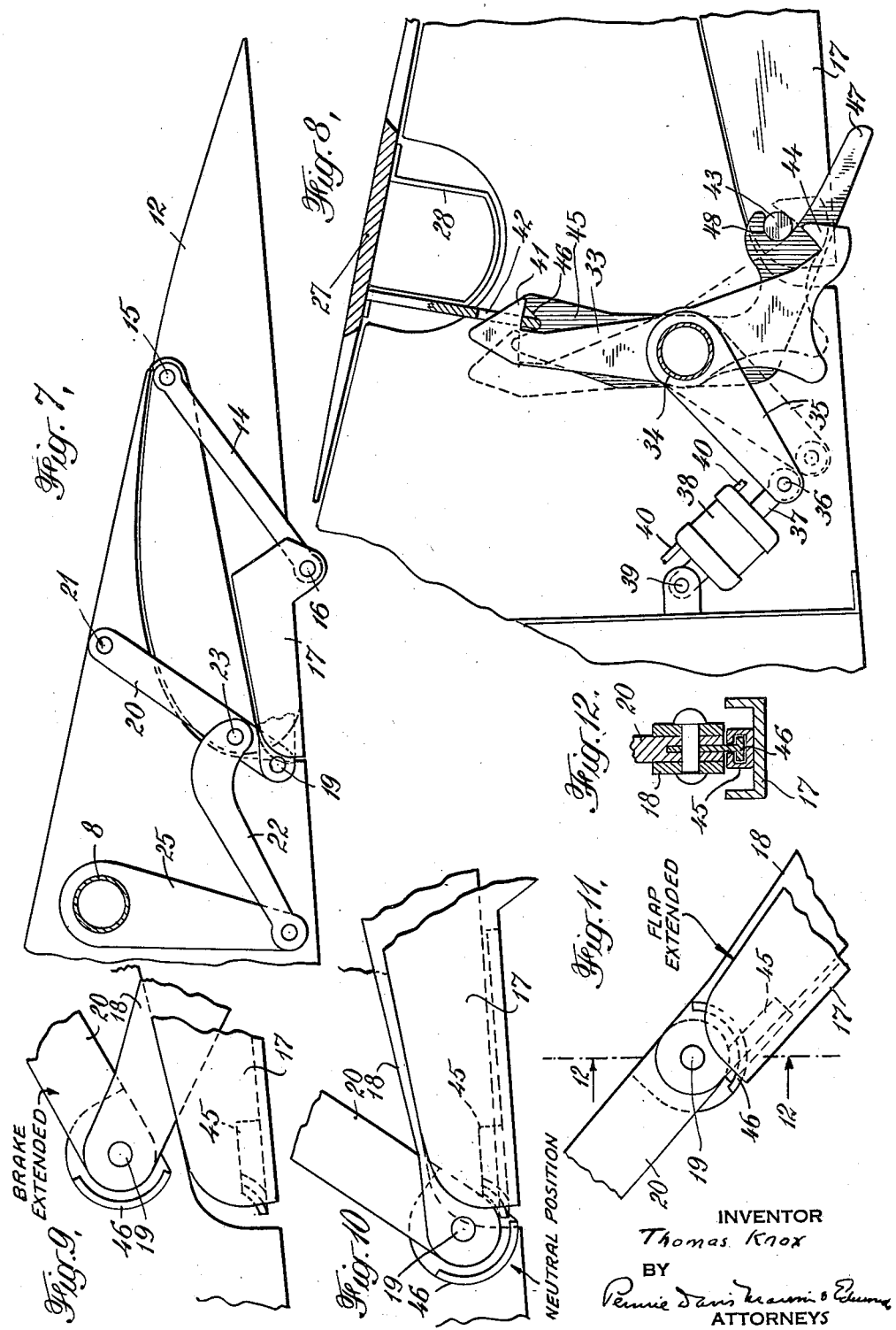

Patented Mar. 28, 1950

2,501,726

UNITED STATES PATENT OFFICE 2,501,726

FLAP AND DIVE BRAKE OPERATING MECHANISM

Thomas Knox, Newtown, Pa., assignor, by mesne assignments, to Kaiser Metal Products, Inc., a corporation of California Application November 1, 1945, Serial No. 625,978

18 Claims. (Cl. 244—42)

This invention relates to aircraft and particularly to flaps and dive brakes mechanism therefor.

Flaps and dive brakes and their respective functions are well known in the aircraft industry. Normally these elements are mounted and actuated through the customary four bar linkage, two systems being necessary, one for each control function. The separation of the two air controls necessitates provisions for separate actuating means as well as separate supporting structure and reinforcement of disrupted main structural members. Attempts to employ a common actuating system have resulted in restrictions in regard to type of flap and flap movement, and in design of dive brakes.

It is the object of this invention to provide a mechanism in which air brakes and flaps may be operated, utilizing the same supporting structure, mechanism and power source for both, and to wholly retain certain desirable features of flaps and air brakes, without compromise due to the mechanism.

Another object of the invention is to provide a flap and dive brake structure assembled and arranged so that either may be actuated selectively by a single operating device which is readily controlled.

A further object of the invention is the provision of linkage which, when actuated, may perform selectively two separate movements to move either the flaps or the dive brakes to operative position.

Another object of the invention is to afford a simple and easily controlled selective means in the linkage whereby the operator can readily control the desired movements of either the flaps or the dive brakes.

Other objects and advantages of the invention will be apparent as it is better understood by reference to the following specification and the accompanying drawings, in which Fig. 1 is a plan view of a portion of the wing of an aircraft illustrating the application of the flaps and dive brakes with the operating mechanism thereof;

Fig. 2 is an enlarged section on the line 2—2 of Fig. 1, illustrating the flap and dive brakes in normal position with the operating mechanism connected thereto;

Fig. 3 is an enlarged plan view partially in section illustrating the structure shown in Fig. 2;

Fig. 4 is a section on the line 4—4 of Fig. 2;

Fig. 5 is a sectional view similar to Fig. 2 illustrating the mechanism with the flap extended;

Fig. 6 is a similar view showing the dive brakes extended;

Fig. 7 is a section on the line 7—7 of Fig. 1;

Fig. 8 is an enlarged view of the selective mechanism which determines the operation either of the flaps or dive brakes;

Fig. 9 is an enlarged elevation of the locking means for the forward edges of the flaps;

Fig. 10 is a similar view showing the parts in a different position;

Fig. 11 shows the mechanism of Figs. 9 and 10 in another position; and

Fig. 12 is a detail in section of a part of the structure of Figs. 9 to 11 inclusive.

Referring to the drawing, the portion 5 of the wing of an aircraft is provided with flaps 6 and dive brakes 7 mounted upon a plurality of linkage mechanisms as hereinafter described, the linkage mechanisms being connected to a torque tube 8 which is journalled in the wing ribs in any suitable manner and actuated through a link 9 by a reversible hydraulic 10. The latter may be controlled in the usual manner by supplying fluid under pressure at either end through pipes 11. The details of the hydraulic system form no part of the present invention. In the further description of the linkage system, it will be understood that duplications thereof occur at intervals along the rearward edge of the wing in order to ensure the actuation of the flaps and dive brakes in the required manner.

The flap 12, which may be of any suitable construction, is supported in a recess beneath overhanging extensions of the wing ribs 13 to each of which a link 14 is pivoted at 15. The link 14 is pivoted at 16 to a bracket 17 to which the flap 12 is rigidly secured, so that the flap 12 may be carried to the position indicated in Fig. 5 by swinging movement of the link 14 about its pivot 15.

To effect this movement, a lever 18 is mounted on the pivot 16 and is connected by a pivot 19 to a link 20 pivoted at 21 as hereinafter described. A link 22 is pivotally connected at 23 to the link 20 and at 24 to a lever 25 which is rigidly secured to the torque tube 8. The lever 25 is connected to the link 9 by a pivot 26. Hence, when the flap 12 is released in the manner hereinafter described, movement of the link 9 to the right under the actuation of the hydraulic 10 will cause the dive brake 31, hereinafter described, and the flap 12 to swing to the position indicated in Fig. 5 to perform the desired function of the flap.

A dive brake 27 consisting of a comb-like member stiffened by a channel bar 28 extending longitudinally thereof and transverse bars 29, is pivotally mounted at 30 on the ribs 13 and connected by the pivot 21 to the link 20. A similar dive brake 31, having a transverse channel member 32, is supported on the lever 18, which is pivoted at 16 on the bracket 17 and pivotally connected at 19 to the link 20. When the dive brakes are released in the manner hereinafter described, movement of the link 9 to the right will actuate the linkage to carry the dive brakes 27 and 31 to the position indicated in Fig. 6, the flap 12 remaining during such operation in its normal position.

The selection necessary to effect the actuation of either the flap 12 or the dive brakes 27 and 31 is accomplished through actuation of the locking device which is more clearly shown in Fig. 8. The locking device consists of a dog 33 mounted upon a torque tube 34 which is journalled in the ribs of the wing and extends longitudinally thereof. A lever 35 is rigidly attached to the torque tube 34 and is pivotally connected at 36 to the piston 37 of a hydraulic 38 pivotally mounted at 39 on any convenient part of the wing frame. The hydraulic is double acting, and may be controlled through the introduction of fluid under pressure through the pipes 40 in the manner well known in the art, to move the lever 35, and hence the torque tube 34, in either direction.

The dog 33 carries at one end a hook 41 which is adapted to engage a loop 42 secured to the under side of the dive brake 27 when the dog is in the position indicated in solid lines in Fig. 8. In this position, the dog prevents operation of the dive brake 27. At the same time, a stud 43 on the bracket 17 is released by a hook 44 at the end of the dog 33, and the flaps 12 and dive brake 31 are free to operate in unison under actuation of the linkage connected thereto. When the dog 33 is moved to the dotted position as shown in Fig. 8, the stud 43 is engaged by the hook 44 so that it is rigidly held, thereby preventing movement of the pivot 16 and link 17 to which the flaps are attached, and at the same time the loop 42 is released, permitting operation of the dive brakes 27 and 31 while the flaps 12 are held from movement. Thus, either the flaps or the dive brakes may be actuated selectively through the linkage as described.

In order that the loop 42 and the stud 43 may be in proper positions for engagement by the hook 41 or the hook 44, depending upon the position of the dog 33, a bracket 45 is fixedly supported on the wing structure and is provided with a notch 46 to receive the end of the loop 42 and also with a tail 47 which guides the stud 43 to a notch 48 in the bracket. Thus, whenever the mechanism is actuated, the parts come to rest in the proper position for locking engagement with the hooks 41 and 44 respectively.

Referring again to Fig. 5 of the drawing, the method of operation will be apparent. Assuming that the dog 33 is in the full line position, the dive brake 27 is held rigidly so that it cannot turn about its pivot 30. At the same time, the stud 43 is released. Hence when the lever 25 is actuated to swing about the axis of the torque tube 8, the pivot 24 actuates the link 22, and the link 20 swings on the pivot 21. The pivotal connection 19, with the lever 18, causes the flap 12 and dive brake 31 to swing in unison with the link 14 about the pivot 15 until the flap is in the position indicated in Fig. 5, in which position it is held by the force exerted through the hydraulic 10. By actuating the hydraulic in the reverse direction, the flap 12 is retracted to its normal position.

Since the link 17 to which the flap 12 is rigidly attached, and link 18 to which the dive brake 31 is rigidly attached, are both pivotally attached to link 14 at pivot 16, it is desirable to provide locking attachment between links 17 and 18 in order to hold the flap structure and the dive brake in their proper relationship to form the complete flap contour. The locking is accomplished by mechanism illustrated in Figs. 9 to 12 inclusive. The link 17 carries a channel member of arcuate form 45, concentric with the pivot 19, which is adapted to be engaged by a T-shaped rib 46 of similar form which is rigidly attached to the end of the link 20 adjacent the pivot 19. As the link 17 leaves the retracted position, the T-shaped member 46 enters the channel member 45 and securely holds the forward end of the links 17 and 18 so long as they are away from retracted position. As the flap is retracted, the connection is automatically freed by the rotation of link 20 with respect to link 17, so that when in the retracted position link 20 and its pivot 19 including the T-shaped rib 46 are free to move upward when the dive brakes are operated.

Assuming now that the dog 33 has been actuated to engage the stud 43 and to release the loop 42, the operation is clearly illustrated in Fig. 6. The flap, being restrained from operation because of engagement of the dog 33 with the stud 43, movement of the lever 25 is transmitted through the link 22 to the link 20. The dive brake 27 swings upwardly about its pivot 30 and the pivotal connection of the link 20 with the lever 18 causes the latter to swing on the pivot 16 carrying the dive brake 31 until the dive brakes have assumed the position indicated in Fig. 6. The link 14 supporting the flap 12 remains stationary during this movement. By actuating the hydraulic 10 in the reverse direction, the dive brakes can be returned to normal position and again locked by the dog 33, if desired, by proper actuation of the selected mechanism. Whenever the dive brakes are locked, the flaps are free for operation, and whenever the flaps are locked, the dive brakes may be actuated. In either case, the same linkage is employed to effect the selected operation, and power is applied through the single hydraulic 10, thus avoiding the necessity for having two separate hydraulics of corresponding size and separate linkages for the flaps and dive brakes. The actuation of the dog 33 requires substantially no power, and the mechanism, such as the hydraulic 38, for effecting such action, may be relatively small so that it does not contribute any substantial amount of weight to offset the reduction in weight which results from the use of a single linkage in the actuation of the flaps and dive brakes.

Among the advantages, other than those mentioned, of the present invention, is the rapidity with which the selection and actuation of the flaps or dive brakes may be accomplished. The control is simple and effective, permitting manipulation with the minimum of attention and effort and assurance that either the flaps or the dive brakes can be placed in operative position almost instantaneously.

The structure is rugged and capable, therefore, of performing its desired function. It affords a considerable simplification of structures heretofore employed for the purpose.

Various changes may be made in the form and

I claim:

1. In a mechanism for aircraft having a wing, the combination of a flap, dive brakes supported respectively on the wing and on the flap, a lever system connected to the flap and dive brakes, means for actuating the lever system and selector means adapted to determine the movements of the lever system when it is actuated, whereby the flap and dive brakes respectively are alternatively moved to operative position.

2. In a mechanism for aircraft having a wing, the combination of a flap, dive brakes supported respectively on the wing and on the flap and capable of movement in opposite directions, a lever system connected to the wing and to the flap and dive brakes and capable of predetermined and distinct movements depending upon selective restraint of the flap and dive brakes respectively, and means for actuating the lever system.

3. In a mechanism for aircraft having a wing, the combination of a flap, dive brakes supported respectively on the wing and on the flap, a lever system connected to the wing and to the flap and dive brakes and capable of predetermined and distinct movements depending upon selective restraint of the flap and dive brakes respectively, means for actuating the lever system and means for selecting the alternative movement thereof.

4. In a mechanism for aircraft having a wing, the combination of a flap, dive brakes supported respectively on the wing and on the flap and capable of pivotal movement in opposite directions, a lever system connected to the wing and to the flap and dive brakes, actuating means for the lever system and means for locking the flap and dive brakes selectively against operation when the lever system is actuated.

5. In a mechanism for aircraft having a wing, the combination of a flap and dive brakes, a lever system connected to the wing and to the flap and dive brakes, actuating means for the lever system and means for locking the flap and dive brakes selectively against operation when the lever system is actuated, including a locking device having means operative in one position to restrain the flap and means operative in another position to restrain one dive brake, and means for shifting the locking device from one position to the other.

6. In a mechanism for aircraft having a wing and a flap and dive brakes supported on the wing, the combination of a lever system connected to the wing and to the flap and dive brakes, actuating means for the lever system and means for locking the flap and dive brakes selectively against operation when the lever system is actuated, including a pivoted dog having means operative in one position to restrain the flap and means operative in another position to restrain one dive brake, and means for shifting the dog from one position to the other on its pivot.

7. In a mechanism for aircraft having a wing, the combination of a flap, dive brakes supported respectively on the wing and on the flap, a lever system connected to the wing and to the flap and dive brakes, means for actuating the lever system, a stud on the flap, releasable means engageable with the stud and means for moving the releasable means to a position where it engages the stud and prevents movement of the flap.

8. In a mechanism for aircraft having a wing, the combination of a flap, dive brakes supported respectively on the wing and on the flap, a lever system connected to the wing and to the flap and dive brakes, means for actuating the lever system, a loop on one dive brake, releasable means engageable with the loop and means for moving the releasable means to a position where it engages the loop and prevents movement of the dive brake having said loop.

9. In a mechanism for aircraft having a wing and a flap and dive brakes supported on the wing, the combination of a lever system connected to the wing and to the flap and dive brakes, means for actuating the lever system, a stud on the flap, a loop on one dive brake, releasable means engageable with the stud and loop, and means for actuating said releasable means to cause it to engage said stud and loop selectively, whereby movement of the flap and dive brake having said loop may be prevented selectively.

10. In a mechanism for aircraft having a wing, the combination of a flap, dive brakes supported respectively on the wing and on the flap, a torque tube, a plurality of lever systems connected to the torque tube and to the flap and dive brakes at intervals longitudinally of the wing, means for actuating the lever systems and selector means determining the movements of the lever systems when they are actuated whereby the flap and dive brakes respectively are alternatively moved to operative position.

11. In a mechanism for aircraft having a wing, the combination of a flap, dive brakes supported respectively on the wing and on the flap, a torque tube, a plurality of lever systems connected to the torque tube and to the flap and dive brakes at intervals longitudinally of the wing, means for actuating the lever systems, selector means, including a movable latch means and means on the flap and one dive brake engageable thereby, and means for moving the latch means to selectively engage the means on the flap and said one dive brake engageable thereby to prevent movement thereof and to determine the movements of the lever systems when they are actuated, whereby the flap and dive brakes respectively may alternatively be moved to operative position.

12. In a mechanism for aircraft having a wing and a flap, dive brakes supported respectively on the wing and on the flap, means for supporting the flap and dive brakes including links, means for alternatively and selectively restraining one and releasing another of the links and a single actuating means for the mechanism.

13. A mechanism for the support and control of aircraft air brakes and flaps including links, a single actuating means for the mechanism, and means for selectively effecting rotational extension of upper and lower surface air brakes simultaneously and the translational and rotational extension of the flap, including latching means for selectively restraining one of the links of the mechanism and simultaneously releasing the other.

14. A mechanism for the support and control of aircraft movable surfaces, consisting of a 4-bar linkage having one pivot point fixed to the aircraft structure, a driving point opposite to the fixed point, means for selectively restraining one link and releasing another of two of the links whereby two separate and distinct motions of the mechanism are effected, and a single actuating means connected to the driving point.

15. A mechanism for the support and control of aircraft movable surfaces consisting of a 4-bar linkage having one pivot point fixed to the aircraft structure, a driving point opposite the fixed pivot point, means for selectively restraining one link and releasing another of two of the links, a single actuating means connected to the driving point and an actuator for the selective restraining and releasing means.

16. In a mechanism for aircraft having a wing, the combination of a flap, upper and lower dive brakes pivotally supported respectively on the wing and on the flap and capable of movement in opposite directions, a lever system connected to the flap and to the dive brakes, means for actuating the lever system and selector means determining the movements of the lever system when it is actuated, whereby the flap and dive brakes are alternatively moved to operative position.

17. In a mechanism for aircraft having a wing, the combination of a flap and dive brakes supported on the wing, a lever system connected to the wing and to the flap and dive brakes, lock engaging elements on the flap and on a dive brake, releasable locking means selectively engageable with one of the lock engaging elements, and means for moving the locking means to selectively engage the lock-engaging elements on the flap and on said dive brake, whereby movement of the flap and said dive brake may be prevented selectively.

18. In a mechanism for aircraft having a wing, the combination of a flap and dive brakes supported on the wing, a lever system connected to the wing and to the flap and dive brakes, actuating means for the lever system, means for locking the flap and dive brakes selectively against operation when the lever system is actuated, including a pivoted locking member, and means for actuating said locking member to one position to restrain the flap and to another position to restrain one dive brake.

THOMAS KNOX.

REFERENCES CITED

The following references are of record in the file of this patent:

UNITED STATES PATENTS

| Number | Name | Date |
|---|---|---|
| 2,137,382 | Blaylock et al. | Nov. 22, 1938 |
| 2,240,892 | Meyer et al. | May 6, 1941 |
| 2,279,615 | Bugatti | Apr. 14, 1942 |
| 2,369,152 | Lowell et al. | Feb. 13, 1945 |
| 2,373,137 | Morgan | Apr. 10, 1945 |
| 2,387,492 | Blaylock et al. | Oct. 23, 1945 |

FOREIGN PATENTS

| Number | Country | Date |
|---|---|---|
| 402,645 | Great Britain | Dec. 7, 1933 |
| 748,398 | France | Apr. 18, 1933 |